US010165075B1

United States Patent
Gildfind

(10) Patent No.: US 10,165,075 B1
(45) Date of Patent: Dec. 25, 2018

(54) RETRIEVING SHARED CONTENT BY PROXY

(71) Applicant: Google LLC, Mountain View, CA (US)

(72) Inventor: Andrew Gildfind, London (GB)

(73) Assignee: Google LLC, Mountain View, CA (US)

( * ) Notice: Subject to any disclaimer, the term of this patent is extended or adjusted under 35 U.S.C. 154(b) by 168 days.

(21) Appl. No.: 15/089,233

(22) Filed: Apr. 1, 2016

(51) Int. Cl.
H04L 29/06 (2006.01)
H04L 29/08 (2006.01)
H04L 12/26 (2006.01)

(52) U.S. Cl.
CPC .............. *H04L 67/28* (2013.01); *H04L 43/10* (2013.01); *H04L 67/42* (2013.01)

(58) Field of Classification Search
CPC ....... H04L 67/02; H04L 67/28; H04L 9/0894; H04L 63/0281; H04L 67/42
See application file for complete search history.

(56) References Cited

U.S. PATENT DOCUMENTS

| 6,910,180 B1 | 6/2005 | Cui et al. |
| 2006/0026067 A1 | 2/2006 | Nicholas et al. |
| 2008/0097830 A1 | 4/2008 | Kim |
| 2009/0006349 A1 | 1/2009 | Fuxman et al. |
| 2010/0064234 A1 | 3/2010 | Schreiber et al. |
| 2010/0145960 A1 | 6/2010 | Casteel et al. |
| 2011/0065376 A1 | 3/2011 | Forutanpour et al. |
| 2011/0184813 A1 | 7/2011 | Barnes et al. |
| 2012/0143713 A1 | 6/2012 | Dittus et al. |
| 2015/0067869 A1* | 3/2015 | Krieger ................... H04L 63/04 726/26 |
| 2017/0279911 A1* | 9/2017 | Megiddo ............. H04L 67/2814 |

OTHER PUBLICATIONS

U.S. Office Action on U.S. Appl. No. 13/800,209 dated Jan. 21, 2016.
U.S. Office Action on U.S. Appl. No. 13/800,209 dated Jul. 7, 2015.

* cited by examiner

Primary Examiner — Mohamed Ibrahim
(74) Attorney, Agent, or Firm — Foley and Lardner LLP

(57) ABSTRACT

A system and method for retrieving shared content by a proxy is provided. The system and method includes a data store comprising a computer readable medium storing a program of instructions for performing the retrieving of the shared content by the proxy; a processor that executes the program of instructions; a data aggregation unit to receive information about an Internet user associated with a web browser from a first data provider and a second data provider, and to aggregate the received information; a vector creation unit to create a vector based on the aggregated received information; a proxy communication unit to transmit the vector to the proxy, and to receive a short term cookie based on the vector from the proxy; and a shared content receiving unit to receive shared content from an online shared content network based on the short term cookie.

14 Claims, 4 Drawing Sheets

RETRIEVING SHARED CONTENT BY PROXY

BACKGROUND

Content may be delivered from various online sources to a device of an Internet user, such as a laptop computer, executing an application such as a web browser. In some instances, content providers provide different content to different users, based on demographic traits or interests, and may use cookies or unique identifiers to identify the device and track browsing habits of the user. However, users may want to access the content without being tracked, or may want to preserve their privacy and anonymity online.

SUMMARY

A system and method for retrieving shared content by a proxy. The system includes a data store; a computer readable medium storing a program of instructions for performing the retrieving of the shared content by the proxy; a processor that executes the program of instructions; a data aggregation unit to receive information about an Internet user associated with a web browser from a first data provider and a second data provider, and to aggregate the received information; a vector creation unit to create a vector based on the aggregated received information; a proxy communication unit to transmit the vector to the proxy, and to receive a short term cookie based on the vector from the proxy; and a shared content receiving unit to receive shared content from an online shared content network based on the vector.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

An Internet user may interact with an online shared content network to retrieve shared content. In doing so, the Internet user becomes susceptible to information associated with the Internet user's browsing activities being leaked to the online shared content network. For example, because the online shared content network may be privy to the cookies that may be used to generate the shared content from the online shared content network, the online shared content network may be able to ascertain personally identifiable information (PII), including information about the Internet user's previous online activities.

The methods and systems disclosed herein are directed to serving shared content via a proxy, such as a proxy server. A proxy server may communicate with a browser executed on a client computing device associated with an Internet user, and may communicate with an online shared content network. The proxy server, by being an intermediary, can ensure that an online shared network and a plurality of data providers do not have access to cookies that may be associated with the Internet user's PII. Further, the proxy server ensures that the history of shared content viewed by the Internet user is not distributed to various third party sites.

The shared content is served via general information from the data provider, and thus, the Internet user does not transmit any PII, such as cookies and other files stored on the Internet user's device, to an online shared content network.

In situations in which the systems discussed here collect personal information about users, or may make use of personal information, the users can be provided with an opportunity to control whether programs or features collect user information (e.g., information about a user's social network, social actions or activities, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user will have control over how information is collected about the user and used by a content server.

Figure 1:
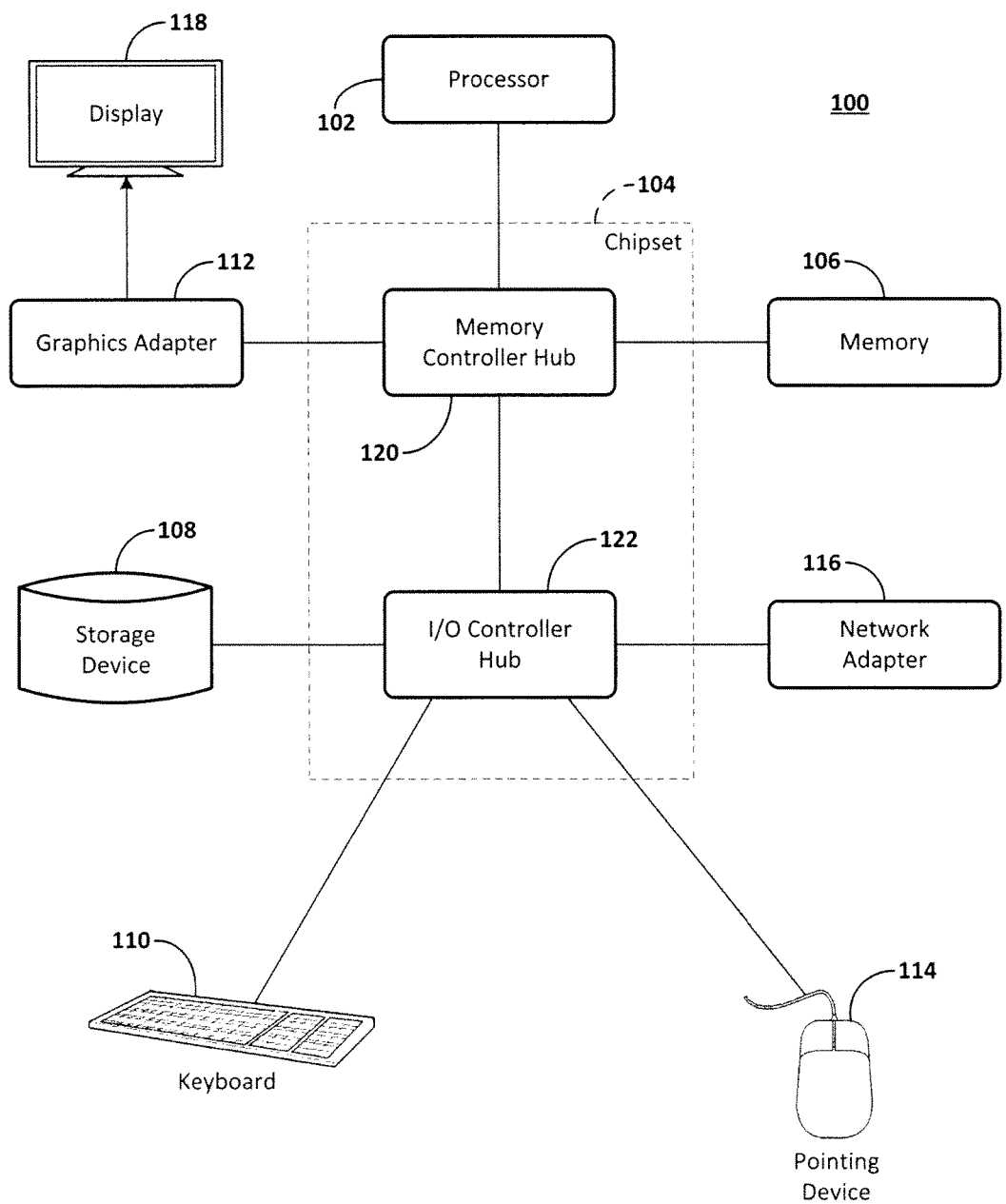
FIG. 1 is a block diagram illustrating an example computer.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. For example, a data store, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
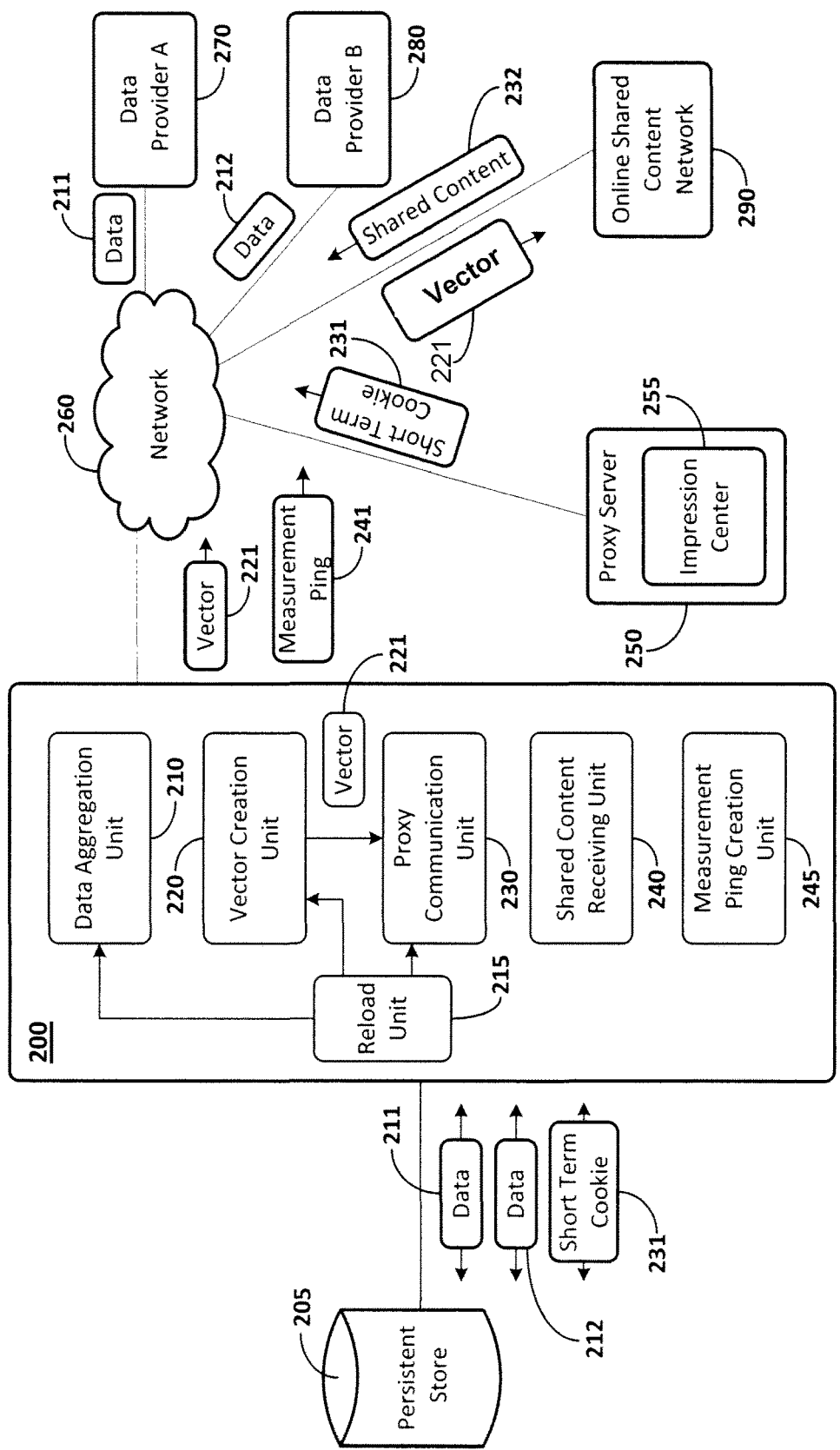
FIG. 2 illustrates an example of a system for retrieving shared content by a proxy.

FIG. 2 illustrates a system 200 for retrieving shared content by a proxy. The system 200 can include a data aggregation unit 210, a reload unit 215, a vector creation unit 220, a proxy communication unit 230, a shared content receiving unit 240, and a measurement ping generation unit 245. The system 200 may be implemented on a device, such as computer 100.

As shown in FIG. 2, the system 200 can communicate with and store data in a persistent store 205. The persistent store 205 is shown as discrete from the system 200, but alternatively may be integrated with system 200. The persistent store may be any data storage device, such as the ones enumerated in reference to data store 108.

The system 200 may be implement as part of an Internet user's browser, or as a stand-alone component in communication with the Internet user's browser. The system 200 communicates via a network 260, such as the Internet, to data provider A 270 and data provider B 280. The system 200 may communicate with a proxy 250 as part of an internal network, such a local area network. Alternatively, the system 200 may communicate with the proxy 250 via a wide-area network such as the network 260.

The data aggregation unit 210 can aggregate data from various data providers, such as data provider A 270 and data provider B 280. The data providers may include a social network site, a blog, or any web site in which the Internet user provides information about their activities or interests, or which can gauge the Internet user's interests based on their activities.

The data aggregation unit 210 may request, via network 260, data from each of the data providers 270 and 280. In response to the request, the data providers may transmit information about the Internet user associated with the web browser. The Internet user may have previously logged-in to various data providers, such as data provider A 270 and data provider B 280. Data provider A 270 and data provider B 280 may transmit data 211 and data 212 to the data aggregation unit 210. Data 211 and data 212 may contain information such as demographic information, interests, or preferences about the Internet user. The data aggregation unit 210 may store data 211 and data 212 in the persistent store 205.

The vector creation unit 220 can create a vector 221 from the data aggregated by the data aggregation unit 210 and stored in the persistent store 205. The vector creation unit 220 can retrieve data associated with the Internet user, such as data 211 and data 212, and use the data to create the vector. The vector 221 may contain information about the Internet user, such as the Internet user's demographics, interest, and activities.

An Internet user may allow the web browser to store login information associated with the various data providers. The web browser, in a background process, may communicate with the data providers to request and subsequently retrieve the data about the Internet user.

The data aggregation unit 210 and the vector creation unit 220 may be connected to a reload unit 215. The reload unit 215 is set with a predetermined time interval. Thus, the reload unit 215 may periodically instigate the data aggregation unit 210 to retrieve updated versions of data 211 and data 212 at the predetermined time interval. Additionally, the reload unit 215 may instigate the vector creation unit 220 to create vector 221 at the predetermined time interval. In this instance, because the data is periodically updated, the vector 221 created by the vector creation unit 220 may reflect an Internet user's updated preferences and information.

The proxy communication unit 230 can retrieve the vector 221, and transmit the vector 221 to a proxy server 250. The proxy server 250 can remove any PII about the Internet user associated from the vector 221, and store the vector 221. The proxy server 250 can produce a short term cookie 231, and transmit the short term cookie 231 back to the proxy communication unit 230.

The proxy communication unit 230 may store the short term cookie 231 in the persistent store 205. The proxy communication unit 230 may instigate a request for an updated short term cookie 231 based on the predetermined time interval as described above in regards to the reload unit 215. Thus, an updated short term cookie 231 may be generated based on an updated vector 221.

The shared content receiving unit 240 may communicate with the online shared content network 290 to retrieve shared content related to the short term cookie 231 retrieved by the proxy communication unit 230. The shared content receiving unit 240 may retrieve the updated short term cookie 231 from the persistent store 205. The shared content receiving unit 240 then may transmit the short term cookie 231 to the proxy server 250. The proxy server 250 may then use the short term cookie 231 to identify and retrieve the vector 221 for the system 200. The proxy server 250 can then transmit a request for shared content to the online shared content network 290, and receive shared content 232 to display along content already being viewed by the Internet user on system 200. The proxy server 250 can obtain the shared content 232. In this way, the proxy server 250 can serve the Internet user shared content without transmitting PII to the online shared content network 290.

The measurement ping generation unit 245 delivers to the proxy server 250 an indication, such as a measurement ping 241, that the shared content 232 has been consumed by the Internet user. In this way, the proxy server 250 may maintain a record of the shared content consumed by the Internet user, and count impressions of the shared content 232.

Alternatively, the shared content receiving unit 240 may transmit the short term cookie 231 to the proxy server 250. The proxy server 250 may include an impression counter 255 that is updated based on the indication transmitted from the measurement ping generation unit 245. In some implementations, the system 200 may transmit the measurement ping and/or short term cookie 231 to an accounting server separate from the proxy server 250.

Thus, the proxy server 250, through keeping a record of the Internet user associated with short term cookie 231, may record the number of views via the impression counter 255 associated with a specific shared content item consumed by the Internet user.

The online shared content network 290 may employ a frequency capping policy. Frequency capping is a policy that each shared content item may be viewed by each Internet user a predefined number of times during a predetermined time interval. Thus, if the online shared content network 290 is cognizant of the number of times the Internet user associated with the short term cookie 231 has viewed specific shared content items, the online shared content network 290 may employ frequency capping in serving shared content.

Thus, if the online shared content network 290 maintains a frequency capping policy for every shared content item, the online shared content network 290 may limit specific shared content items from being transmitted based on a count retrieved from the impression counter 255.

Figure 3:
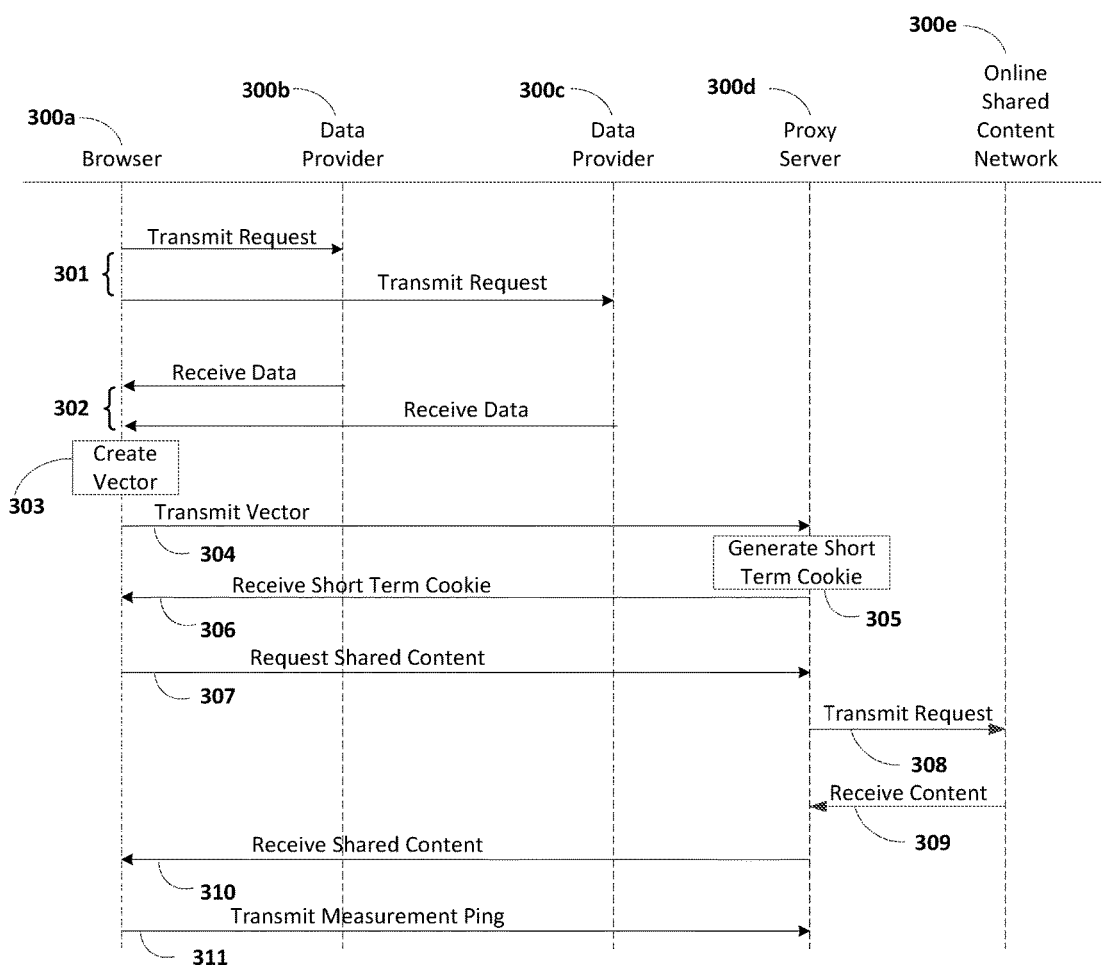
FIG. 3 illustrates an example of a method for retrieving shared content by a proxy.

FIG. 3 illustrates an example of a method 300 for retrieving shared content via a proxy. The method 300 may be implemented on a client device, such as a desktop or laptop computing device executing a web browser application, a mobile device executing a web browser application, or system 200. FIG. 3 includes a browser 300a, a data provider 300b, a data provider 300c, a proxy server 300d, and an online shared content network 300e. In the example shown in FIG. 3, two data providers are shown; however, the method 300 can include interaction with any number of data providers.

In operation 301, a browser 300a can transmit a request to one or more data providers, such as data provider 300b or data provider 300c for data associated with an Internet user. An Internet user associated with the browser 300a may have previously authorized the browser 300a to retrieve data from the data providers. The request may occur as a background process.

In operation 302, the browser 300a may receive data from the various data providers, such as data provider 300b and data provider 300c, responsive to the transmitted request. The information may contain information about the Internet user stored on the respective data provider from which the information is sourced. The information can include demographic information as well as information related to the user's interests. The demographic information can include characteristics or traits of the user, the user's location, or other such demographic information. The information related to the user's interest can include interest groups of which the user is a member, news topics the user follows, "likes" or "+1s" the user has made, personal or commercial accounts the user follows, etc.

In operation 303, the browser 300a can combine the data received in operation 302 to create a targeting vector. The targeting vector can include the information pertaining to the Internet user sourced from data provider 300b and data provider 300c. The targeting vector may comprise a string of values for predetermined demographic parameters; a sequence of values representing coordinates in a multi-dimensional space where each dimension represents a type of trait; a series of parameter and value combinations; a set of definitions and values in an interpretable language (e.g. XML); or any other such type and form of data representation. The browser 300a can store the targeting vector locally at system 200 for later transmission to the proxy server 300d. The browser 300a can repeat operations 301 to 303 periodically or at random intervals to keep the targeting vector up to date. Operations 301 to 303 can be repeated every few hours to every few days.

In operation 304, the browser 300a can transmit the targeting vector to the proxy server 300d. In operation 305, the proxy server 300d can generate a short term cookie, and associate it with the transmitted vector. The short term cookie may allow the proxy server 300d to identify the Internet user, while ensuring that no PII about the Internet user is shared with the online shared content network 300e. For example, the short term cookie may be a randomly generated number and may be associated with the targeting vector by the proxy server, but include none of the data from the targeting vector. The proxy server 300d can use the short term cookie to identify the Internet user and associate that user with the targeting vector generated in operation 303.

In operation 306, the browser 300a can receive the short term cookie from the proxy server 300d. The browser 300a may store the short term cookie for use in requesting shared content. In the method 300, the operations 301 to 306 may be repeated periodically, randomly, or based on a trigger, such as a detected update of the targeting vector. Thus, the short term cookie generated in operation 305 may be updated based on changes to the Internet user's data associated with the data providers.

In operation 307, the browser 300a may request shared content. The browser 300a may request shared content for display in a slot of a resource or online document rendered on a display associated with the browser 300a. The browser 300a may include the short term cookie and some amount of context for the shared content request. The context can include an identifier of the campaign, a shared content type, a creative ID, and page context identifying which part of the resource or online document the Internet user is browsing. The proxy server 300d can use the short term cookie to retrieve the targeting vector previously transmitted by the browser 300a in operation 304.

In operation 308, the proxy server 300d can transmit a request for shared content to the online shared content network 300e. The request may include a portion of the targeting vector transmitted by the browser 300a in operation 304 and the context for the shared content request transmitted in operation 307. The proxy server 300d may scrub any sort of personal identifying information (PII) from the targeting vector and the context prior to transmitting the request to the online shared content network 300e. For example, the proxy server 300d may scrub information associated with client device and browser 300a, such as IP address, browser type, or the like. This can prevent the online shared content network 300e from building even a semi-stable identifier for the browser 300a from other request context information, such as IP address, browser type, time of requests, etc. In some implementations, the proxy server 300d may remove the targeting vector and/or any demographic information from the request. To allow targeting of content, the proxy server 300d may, in some implementations, request specific types of content without including some or all of the information in the targeting vector.

In operation 309, the proxy server 300d can receive shared content from the online shared content network 300e responsive to the request transmitted in operation 308. The shared content can include an image, video, or text for display in the browser 300a.

In operation 310, the browser 300a can receive the shared content from the proxy server 400d. The browser 300a can display the shared content.

In operation 311, the browser 300a may transmit a measurement ping indicating that the Internet user associated with the short term cookie has consumed the shared content received in operation 310. The browser 300a may transmit the measurement ping to the proxy server 300d. Alternatively, the browser 300a may transmit the measurement ping to an accounting server separate from the proxy server 300d. In either case, the browser 300a may transmit the measurement ping so that the shared content impression may be counted for tracking or billing purposes.

Figure 4:
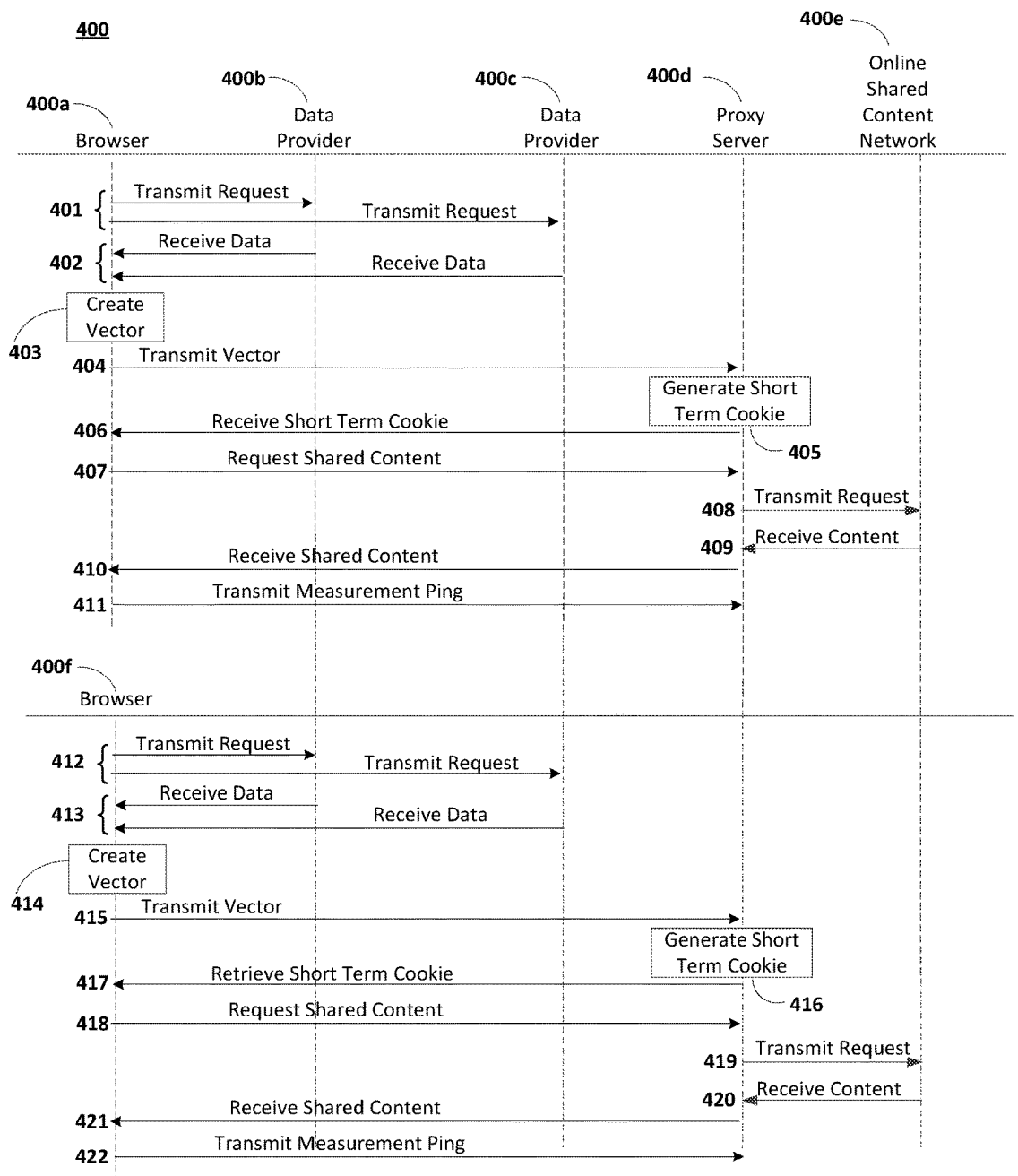
FIG. 4 illustrates an example of a method for retrieving shared content by a proxy.

FIG. 4 illustrates an example of a method 400 for retrieving shared content via a proxy. The method 400 may be implemented on a client device, such as a desktop or laptop computing device executing a web browser application, a mobile device executing a web browser application, or system 200. FIG. 4 includes a browser 400a, a data provider 400b, a data provider 400c, a proxy server 400d, an online shared content network 400e, and a second browser 400f In the example shown in FIG. 4, two data providers are shown; however, one of ordinary skill in the art may implement method 400 to interact with any number of data providers. Operations 401 to 411 can be substantially similar to operations 301 to 311, respectively. The method 400 can be repeated for many client devices to aggregate the behavior of dozens, thousands, or even millions of users in such a way that it can become impractical for the online shared content network to identify or track the activity of any one client device. For example, the operations 412 to 422 can be performed for the browser 400f in a manner similar to the operations 401 to 411, respectively, performed for the browser 400a. In this case, the activities of browser 400f can represent a second Internet user, or the same Internet user of the browser 400a.

The proxy server 400d can be located at different levels of the network topology to facilitate retrieval of shared content while preventing tracking of the client devices receiving the shared content. The proxy server 400d can be located at the street, block, or metro level; at the internet service provider (ISP) level, or as a large internet connected service.

The proxy server 400d can receive a number of requests from different client computing devices and aggregate the requests for shared content into a single compound request for content. The proxy server 400d can send, for example, a compound request for content to the online shared content network 400e that includes several requests grouped into various buckets.

The proxy server 400d can generate spurious requests to further obscure tracking attempts by the online shared content network 400e. The proxy server 400d can transmit the spurious requests to the online shared content network 400e. The spurious requests may be used to increase request volume and add "noise" to clusters of requests that, by themselves, may be sufficiently undifferentiated and correlatable to allow approximate or definite identification of an individual user.

This system can allow Internet user credentials to be masked from online shared content networks such as content servers and advertisement serving networks, and deliver privacy to the Internet users. In some implementations, the absence of a stable identifier at the time of serving shared content to the browser may make it difficult to implement certain features. For example, in some instances, a system may attempt to identify client devices receiving an item of content to insure that the content is not repeatedly delivered to the same device, potentially annoying a user. This may be referred to as content delivery frequency capping, in some implementations. In the absence of stable device identifiers, it may be difficult to frequency cap certain shared content to ensure, for example, that a particular browser is not served with the same shared content too many times over a short time period. In addition, it may be difficult to measure the reach of an item of shared content, where reach is defined as the number of unique users who have viewed the item of shared content. Depending on the relative value of maximizing privacy versus providing some measure of frequency capping and reach measuring, several modifications to the systems and methods are possible.

In one implementation, the system may allow limited tracking. For example, at both the shared content request time and the measurement time, the system can return a semi-stable, rotating identifier that resets at a predefined interval T. By selecting T appropriately (e.g., 1 week, 1 month, etc.) trackable intervals can be arbitrarily increased or decreased. The system can the model and statistically compensate for the rotating identifier when measuring aggregate shared content serving statistics.

In another implementation, tracking can be implemented for subsets of the population. The system can return a flag from the proxy server that enables a stable ID to be sent from the browser, but only on a subset of browsers. The system can use the subsample to model the behavior of the overall sample. The system can periodically sample different parts of the overall population.

In still another implementation, the system can combine the two previous modifications. The system could use a mix of semi-stable and persistent identifiers within a subsample. The system can then both model the overall sample based on the rotating identifiers while extrapolating behavior from measurements of the subsample.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 2. The disclosed devices, components, and systems contemplate using or implementing any suitable technique for performing the steps illustrated in these figures. Thus, FIG. 2 is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" or "processing circuit" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Accordingly, implementations of the systems and methods discussed herein allow delivery or retrieval of shared content via a proxy. In a first aspect, the present disclosure is directed to a system for retrieving shared content by a proxy. The system includes a proxy server comprising a memory and one or more processors. The one or more processors are configured to receive, from a client computing device over a computer network, a targeting vector, the targeting vector generated by the client computing device based on information about a user of the client computing device received from a plurality of data sources. The one or more processors are configured to generate a short term cookie associated with the targeting vector. The one or more processors are configured to transmit the short term cookie to the client computing device. The one or more processors are configured to receive, from the client computing device, a first request for shared content, the first request including the short term cookie and a request context. The one or more processors are configured to retrieve, from the memory, the targeting vector associated with the short term cookie. The one or more processors are configured to transmit, to an online shared content network, a second request including a portion of the targeting vector and the request context. The one or more processors are configured to receive, from the online shared content network separate from the proxy server, a content item in response to the second request. The one or more processors are configured to transmit, to the client computing device, the content item responsive to the first request, receipt of the content item triggering the client computing device to display the content item.

In certain implementations, the one or more processors are further configured to receive, from the client computing device, a measurement ping indicating that the client computing device has displayed the content item. In certain implementations, the one or more processors are further configured to generate the second request by removing all personal identification information (PII) about the user from the targeting vector and the request context. In certain implementations, one of the plurality of data providers is a social network provider. In certain implementations, the one or more processors are further configured to periodically generate a new short term cookie and transmit the new short term cookie to the client computing device. In certain implementations, the one or more processors are further configured to periodically receive a new targeting vector from the client computing device, the new targeting vector based on updated information about the user received by the client computing device from the plurality of data providers. In certain implementations, the one or more processors are further configured to generate a rotating, semi-stable identifier; transmit the semi-stable identifier to the client computing device; and receive, from the client computing device, a measurement ping indicating that the client computing device has displayed the content item, the measurement ping including the semi-stable identifier.

In a second aspect, the present disclosure is directed to a method of retrieving shared content by a proxy. The method includes receiving, by a proxy server from a client computing device, a targeting vector, the targeting vector generated by the client computing device based on information about a user of the client computing device received from a plurality of data sources; generating, by one or more processors of the proxy server, a short term cookie associated with the targeting vector. The method includes transmitting, by the proxy server, the short term cookie to the client computing device. The method includes receiving, by the proxy server from the client computing device, a first request for shared content, the first request including the short term cookie and a request context. The method includes retrieving, from a memory of the proxy server, the targeting vector associated with the short term cookie. The method includes transmitting, by the proxy server to an online shared content network separate from the proxy server, a second request including a portion of the targeting vector and the request context. The method includes receiving, by the proxy server from the online shared content network, a content item in response to the second request. The method includes transmitting, by the proxy server to the client computing device, the content item responsive to the first request, receipt of the content item triggering the client computing device to display the content item.

In certain implementations, the method includes receiving, by the proxy server from the client computing device, a measurement ping indicating that the client computing device has displayed the content item. In certain implementations, the one or more processors generate the second request by removing all personal identification information (PII) about the user from the targeting vector and the request context. In certain implementations, one of the plurality of data providers is a social network. In certain implementations, the method includes: generating, by the one or more processors, a new short term cookie periodically; and transmitting, by the one or more processors, the new short term cookie to the client computing device. In certain implementations, the method includes: receiving, by the proxy server from the client computing device, a new targeting vector, the new targeting vector based on updated information about the user received by the client computing device from the plurality of data providers. In certain implementations, the method includes: generating, by the one or more processors, a rotating, semi-stable identifier; transmitting, by the proxy server, the semi-stable identifier to the client computing device; and receiving, by the proxy server from the client computing device, a measurement ping indicating that the client computing device has displayed the content item, the measurement ping including the semi-stable identifier.

In a third aspect, the present disclosure is directed to a system for retrieving shared content by a proxy. The system includes a client computing device comprising a memory and one or more processors, wherein the processor is configured to generate a targeting vector based on information about a user of the client device received from a plurality of data sources. The processor is configured to transmit, to a proxy server, the targeting vector. The processor is configured to receive, from the proxy server, a short term cookie, the proxy server associating the targeting vector with the short term cookie. The processor is configured to transmit, to the proxy server, a first request for shared content, the first request including the short term cookie and a request context. The processor is configured to receive, from the proxy server in response to the first request, a content item for display, the content item retrieved by the proxy server from an online shared content network separate from the proxy server based on a portion of the targeting vector and the request context. The processor is configured to display the content item.

In certain implementations, the one or more processors are further configured to transmit a measurement ping to the proxy server, the measurement ping indicating that the client computing device has displayed the content item. In certain implementations, the one or more processors are further configured to transmit a measurement ping to an accounting server separate from the proxy server, the measurement ping indicating that the client computing device has displayed the content item. In certain implementations, the one or more processors are further configured to generate the targeting vector as a background process. In certain implementations, the one or more processors are further configured to update the targeting vector responsive to expiration of a predetermined time interval. In certain implementations, one of the plurality of data providers is a social network provider.

While this specification contains many specific implementation details, these should not be construed as limitations on the scope of what may be claimed, but rather as descriptions of features specific to particular embodiments. Certain features described in this specification in the context of separate embodiments can also be implemented in combination in a single implementation. Conversely, various features described in the context of a single implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A system for retrieving shared content by a proxy, comprising:
 a proxy server located at one of a metro level and an Internet service provider (ISP) level of a computer network, the proxy server comprising a memory and one or more processors, wherein the one or more processors are configured to:
  receive, from a client computing device over the computer network, a targeting vector, the targeting vector generated by the client computing device based on information about a user of the client computing device received from a plurality of data sources,
  generate a short term cookie associated with the targeting vector,
  transmit the short term cookie to the client computing device,
  receive, from the client computing device, a first request for shared content, the first request including the short term cookie and a request context,
  retrieve, from the memory, the targeting vector associated with the short term cookie,
  transmit, to an online shared content network separate from the proxy server, a second request including a portion of the targeting vector and the request context,
  receive, from the online shared content network, a content item in response to the second request,
  transmit, to the client computing device, the content item responsive to the first request, receipt of the content item triggering the client computing device to display the content item,
  transmit, to the online shared content network, a plurality of spurious requests for shared content, the spurious requests increasing request volume and increasing a difficulty of the online shared content network identifying the user, receive, from the online shared content network, a plurality of content items in response to the plurality of spurious requests, and discard the plurality of content items.

2. The system of claim 1, wherein the one or more processors are further configured to receive, from the client computing device, a measurement ping indicating that the client computing device has displayed the content item.

3. The system of claim 1, wherein the one or more processors are further configured to generate the second request by removing all personal identification information (PII) about the user from the targeting vector and the request context.

4. The system of claim 1, wherein one of the plurality of data providers is a social network provider.

5. The system of claim 1, wherein the one or more processors are further configured to periodically generate a new short term cookie and transmit the new short term cookie to the client computing device.

6. The system of claim 1, wherein the one or more processors are further configured to periodically receive a new targeting vector from the client computing device, the new targeting vector based on updated information about the user received by the client computing device from the plurality of data providers.

7. The system of claim 1, wherein the one or more processors are further configured to:

generate a rotating, semi-stable identifier;

transmit the semi-stable identifier to the client computing device; and receive, from the client computing device, a measurement ping indicating that the client computing device has displayed the content item, the measurement ping including the semi-stable identifier.

8. A method of retrieving shared content by a proxy, comprising:

receiving, by a proxy server from a client computing device, a targeting vector, the targeting vector generated by the client computing device based on information about a user of the client computing device received from a plurality of data sources;

generating, by one or more processors of the proxy server, a short term cookie associated with the targeting vector;

transmitting, by the proxy server, the short term cookie to the client computing device;

receiving, by the proxy server from the client computing device, a first request for shared content, the first request including the short term cookie and a request context;

retrieving, from a memory of the proxy server, the targeting vector associated with the short term cookie;

transmitting, by the proxy server to an online shared content network separate from the proxy server, a second request including a portion of the targeting vector and the request context;

receiving, by the proxy server from the online shared content network, a content item in response to the second request;

transmitting, by the proxy server to the client computing device, the content item responsive to the first request, receipt of the content item triggering the client computing device to display the content item, transmitting, by the proxy server to the online shared content network, a plurality of spurious requests for shared content, the spurious requests increasing request volume and increasing a difficulty of the online shared content network identifying the user;

receiving, by the proxy server from the online shared content network, a plurality of content items in response to the plurality of spurious requests; and discarding, by the proxy server, the plurality of content items.

9. The method of claim 8, further comprising receiving, by the proxy server from the client computing device, a measurement ping indicating that the client computing device has displayed the content item.

10. The method of claim 8, wherein the one or more processors generate the second request by removing all personal identification information (PII) about the user from the targeting vector and the request context.

11. The method of claim 8, wherein one of the plurality of data providers is a social network.

12. The method of claim 8, further comprising:

generating, by the one or more processors, a new short term cookie periodically; and transmitting, by the one or more processors, the new short term cookie to the client computing device.

13. The method of claim 8, further comprising:

receiving, by the proxy server from the client computing device, a new targeting vector, the new targeting vector based on updated information about the user received by the client computing device from the plurality of data providers.

14. The method of claim 8, further comprising:

generating, by the one or more processors, a rotating, semi-stable identifier;

transmitting, by the proxy server, the semi-stable identifier to the client computing device; and receiving, by the proxy server from the client computing device, a measurement ping indicating that the client computing device has displayed the content item, the measurement ping including the semi-stable identifier.

* * * * *